July 3, 1945.　　　A. C. HASTINGS, JR　　　2,379,635
FLUID-TIGHT SEAL
Filed April 30, 1943
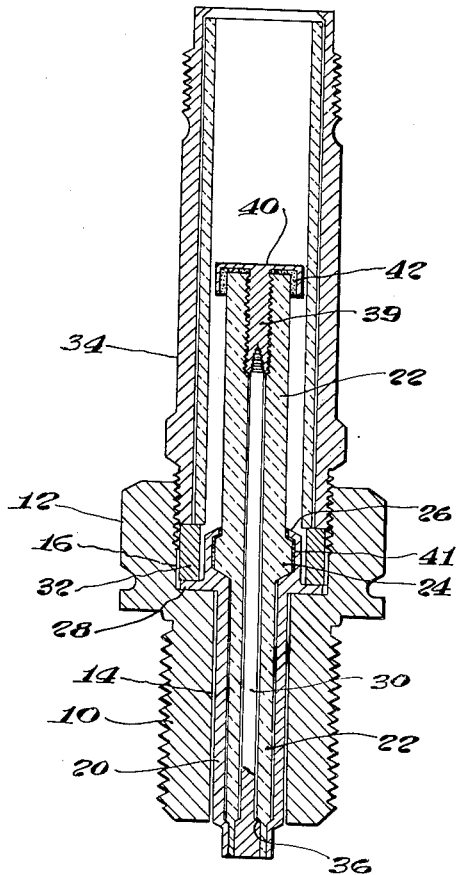
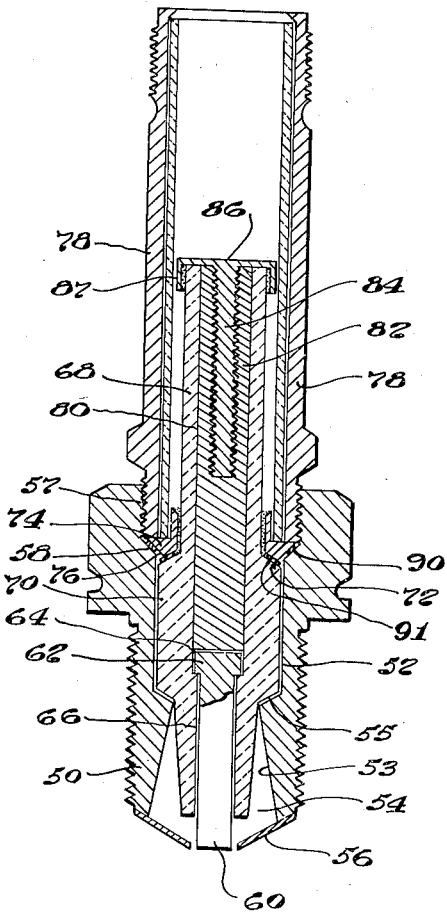
INVENTOR.
Arthur C. Hastings, Jr
BY J. Stanley Churchill
Atty.

Patented July 3, 1945

2,379,635

UNITED STATES PATENT OFFICE 2,379,635

FLUIDTIGHT SEAL

Arthur C. Hastings, Jr., South Yarmouth, Mass.

Application April 30, 1943, Serial No. 485,174

15 Claims. (Cl. 123—169)

This invention relates to a fluid-tight seal and to a method of producing a fluid-tight seal between contiguous members.

In general, the object of the invention in its broader aspects is to produce a novel and superior fluid-tight seal between adjacent surfaces of contiguous members to prevent the passage of a fluid, such as a gas, between the members.

A further and more specific object of the invention is to provide a novel and superior fluid-tight seal between the adjacent surfaces of contiguous members, the efficiency of which is independent of the character of the members themselves and which lends itself to use under relatively high temperature conditions.

A still further object of the invention is to provide a novel and superior sealed joint between dissimilar members having different coefficients of expansion which is capable of preventing the passage of a fluid, such as a gas, between said members under different conditions of use and when subjected to widely varying temperatures.

A still further object of the invention is to provide a novel and improved spark plug embodying the present novel fluid-tight joint as will be hereinafter more particularly described and by which a superior and more useful spark plug may be produced in a simple and economical manner than has heretofore been possible.

With these general objects in view, and such others as may hereinafter appear, the invention consists in the improved seal, in the method of producing an improved sealed joint between adjacent surfaces of contiguous members, and also in the improved construction of spark plug, all as hereinafter described and more particularly defined in the claims at the end of this specification.

In the drawing, Fig. 1 is a vertical sectional view of an aeronautical spark plug embodying the invention, and Fig. 2 is a similar view of a modified form of aeronautical spark plug also embodying the invention.

It has heretofore been recognized that in order to make a satisfactory fluid-tight seal between two contiguous members it is necessary that the sealing material possess the ability to wet the surfaces of both of the members to secure a strong and efficient bond thereto. Metallic solders possess this characteristic and may be efficiently used to provide a seal between two metals. The known metal solders of which I am aware, do not wet the surface of glass and ceramics and consequently cannot be used to make a satisfactory seal between porcelain and metal, between porcelain and porcelain, or between glass and glass. Many sealing materials which do possess the ability to wet the surfaces of both metal and non-metallic materials, such as porcelain, glass, and the like, are defective in other respects, particularly in their ability to withstand higher temperatures. Among such materials may be mentioned sealing wax, tar, certain asphalts, rubber and certain other cements. These materials are generally characterized by softening and melting at relatively low temperatures, and in addition many of such materials are of an organic nature and tend to deteriorate rapidly upon aging.

In certain industries, particularly those producing electric light bulbs, radio tubes, and the like, a satisfactory seal between metal and glass has been effected by the use of special metal alloys and special glass where the coefficients of expansion of the two materials are approximately the same. In practice, however, these coefficients of expansion are never exactly the same with the result that a definite liability exists for the seal to crack, particularly when the sealed structure is subjected to temperature changes over any wide range.

Another method which has been resorted to in the attempt to seal two glasses having dissimilar coefficients of expansion has been to make a graduated seal, using as many as six or eight graduated glasses to make the seal between the two dissimilar glasses, such for example as between quartz and ordinary glass.

From the description thus far it will be apparent that the production of a satisfactory fluid-tight seal or joint between two contiguous but spaced members, particularly between two such members possessing different coefficients of expansion, has presented a problem.

I have discovered that a superior fluid-tight seal or joint may be produced between the adjacent surfaces of two contiguous but spaced members by utilizing silver chloride as the sealing material. Silver chloride has a melting point slightly in excess of 850° F. and possesses characteristics which render it particularly suitable for the production of an efficient and satisfactory seal between two such contiguous members, particularly where the members are of materials possessing dissimilar coefficients of expansion. In its fused condition silver chloride possesses the ability of wetting the surfaces of a large number of materials, including glass, ceramics, and metal, and after application to such surfaces and upon solidification forms a strong and efficient seal which is permanent over a wide temperature range, even approaching its melting point. In its solidified condition silver chloride is flexible, waxy, and readily conforms to differences in the expansion of the two contiguous members.

Referring to the drawing, for purposes of illustration I have shown in Fig. 1 an improved aeronautical spark plug embodying the invention and in which provision is made for producing a novel and improved fluid-tight joint between the outer and inner electrodes of the plug and the ceramic insulator which is used to separate and insulate the two electrodes from one another. As herein shown, the body portion of the plug comprises a steel shell 10 provided with a hexagonal nut 12. The steel shell 10 is provided with a central bore 14 which communicates with an enlarged countersunk hole 16 in the upper portion of the steel shell 10. The outer electrode 20 comprises a tubular metal housing for protecting a tubular ceramic insulator 22, the latter being provided with an enlarged portion or annular boss 24 at substantially the mid portion thereof. The tubular metal housing 20 comprising the outer electrode is provided with a generally cylindrically shaped upper end, shaped to correspond to the projecting annular boss 24 upon the ceramic insulator and the upper end 26 of the metal housing 20 may be spun over the upper surface of the annular boss to hold the outer electrode and housing in position. The outer electrode is further provided with an annular flange 28 adapted to seat in the bottom of the enlarged hole 16 in the outer metal shell, as illustrated, and the ceramic insulator 22, outer electrode 20 as well as the inner electrode 30, as will be described, are secured in fixed relation to the outer metallic shell by a spacer ring 32 resting upon the upper surface of the annular flange 28 and itself held in position by the lower end of a steel shield member 34, the lower end of which is threaded and screwed into the threaded upper end of the enlarged hole 16 in the steel shell 10. The inner electrode 30 is herein shown in the form of a rod, the lower end of which is provided with a shoulder 36 adapted to fit a correspondingly shaped portion of the ceramic insulator as shown, and the upper end of the rod 30 is threaded and screwed into a threaded hole in a member 39 depending from a cap member 40, the member 39 being screwed into a threaded hole in the upper end of the ceramic insulator as shown.

In order to provide a fluid-tight joint between the ceramic insulator 22 and the outer and inner electrodes 20, 30, I have, in accordance with the present invention, utilized fused silver chloride as a sealing member in order to produce a sealed joint between the cylindrically shaped portion of the upper electrode and the cooperating boss 24 projecting from the ceramic insulator and upon hardening the silver chloride seal 41 thus produced effectively seals the space between the outer surface of the ceramic insulator and the outer electrode preventing the passage of gas therebetween. It is preferred to silver plate the steel outer electrode at those portions of the upper end thereof which are designed to come in contact with the silver chloride in order to prevent corrosion.

In order to provide an effective fluid-tight seal to prevent the passage of gas between the inner electrode 30 and the inner surface of the tubular ceramic insulator 22, I prefer to provide a silver chloride seal 42 between the cap 40 and the upper surface of the insulator 22. As herein shown, the metal cap is formed as an integral part of the downwardly projecting threaded member 39, and it is preferred to silver plate the cap and to seal it to the end and to the upper peripheral surface of the insulator, as indicated in Fig. 1.

In Fig. 2 I have illustrated a modified form of aeronautical spark plug comprising an outer steel shell 50 provided with a central bore 52, the lower end of which is tapered at 53 and communicates with a firing chamber 54 formed in the extreme lower portion of the shell 50. The lower end of the metal shell 50 has welded or otherwise secured to it a conical disk 56 comprising the outer electrode. The upper end of the steel body portion 50 is bored to a diameter larger than the central bore 52 and a tapered shoulder 58 is provided at the bottom of the upper bore 57. The central or inner electrode 60 comprises a metal member having an enlarged head 62 received within an enlarged portion 64 of a central bore 66 within a ceramic insulator 68. The ceramic insulator 68 is provided with an enlarged body portion 70 of cylindrical shape and of a size adapted to fit within the central bore 52 in the outer shell 50 and the opposite ends of the cylindrically shaped body portion 70 of the ceramic insulator are tapered as illustrated, the lower tapered end 55 being designed to fit upon a tapered shoulder and the upper tapered end 72 being designed to cooperate with and engage the under surface of an annular lug 74, the outer surface of which is tapered at 76 to fit the corresponding taper 58 on the bottom of the upper bore 57 of the steel shell 50. The upper surface of the lug 74 is arranged to be engaged by the lower end of a steel shield member 78, the lower end of which is threaded and screwed into the threaded upper end of the upper bore 57 of the steel shell, thus forcing the lug against the tapered bottom surface 58 of the upper bore and into engagement with the tapered shoulder 72 on the top of the body portion of the ceramic insulator 68. The central bore 80 within the ceramic insulator 68 is filled with an electrically conducting high heat resisting filler such as graphite filled with metal filings or asbestos cement filled with metal filings, indicated generally at 82 which acts as a partial seal to prevent the upward flow of gases between the center electrode and the surrounding walls of the bore 80 and the depending portion 84 of the top cap 86 is threaded and screwed into the heat resisting filler member 82. The cap member 86 itself is arranged to cover the end of the ceramic insulator 68 and is provided with a downwardly turned lip 87 as illustrated. In order to provide a fluid-tight seal between the outer electrode and the outer surface of the ceramic insulator 68, I provide a silver chloride seal between the inner surface of the metal lug 74 and the corresponding portions of the ceramic insulator with which the lug engages. The outer and under tapered surfaces of the lug 74 are arranged to bear against metal gaskets 90, 91 disposed between it and the tapered bottom shoulder 58 of the upper bore of the steel shaft and the tapered surface 72 of the cylindrical insulator 68 respectively. In order to effectively seal the space between the inner electrode 60 and the ceramic insulator to prevent passage of gas between these parts, I prefer to silver plate the cap 86 and to provide a silver chloride seal in the manner above described, between the under surface of the cap and the top and upper peripheral portions of the ceramic insulator.

While it is preferred to utilize silver chloride as the material for forming the various fluid-tight seals as above described, nevertheless, satisfactory results are obtainable utilizing silver bromide instead of silver chloride and as used throughout the specification and claims, it is to be understood that the term silver chloride is intended to include silver bromide as well as silver chloride.

While the preferred embodiments of the invention have been herein illustrated and described, it will be understood that the invention may be embodied in other forms within the scope of the following claims.

Having thus described the invention, what is claimed is:

1. In a spark plug having a body portion comprising a metal shell forming the outer electrode provided with a longitudinal bore, a ceramic insulator within the bore, and a central electrode within the insulator, means forming a fluid-tight seal between the insulator and the outer and inner electrodes comprising a fused silver chloride seal bonded to portions of the insulator and outer and inner electrodes, the portion of the electrodes to which the silver chloride is bonded being silver-plated.

2. In a spark plug having a body portion comprising a metal shell forming the outer electrode provided with a longitudinal bore, a ceramic insulator within the bore, and a central electrode within the insulator, means forming a fluid-tight seal between the ceramic insulator and the inner electrode comprising a fused silver chloride seal bonded to each, the portion of the inner electrode to which the silver chloride is bonded being silver-plated.

3. In a spark plug having a body portion comprising a metal shell forming the outer electrode provided with a longitudinal bore, a ceramic insulator within the bore, and a central electrode within the insulator, means forming a fluid-tight seal between the ceramic insulator and outer electrode comprising a fused silver chloride seal bonded to each, the portion of the outer electrode to which the silver chloride is bonded being silver-plated.

4. In a spark plug, an outer metal electrode of tubular shape, a tubular ceramic insulator disposed within and having its lower end terminating in substantially the plane of the end of the tubular outer electrode, a central electrode coextensive in length with and disposed within the tubular insulator, and fluid-tight fused silver chloride seals between the insulator and the outer and inner electrodes respectively, the portions of said electrodes to which the silver chloride is bonded being silver-plated.

5. In a spark plug, an outer metal electrode of tubular shape, a tubular ceramic insulator disposed within and having its lower end terminating in substantially the plane of the end of the tubular outer electrode, a central electrode coextensive in length with and disposed within the tubular insulator, said insulator being provided with an annular boss and said outer electrode having a portion surrounding and conforming to the shape of said boss, a fluid-tight fused silver chloride seal between the boss and said portion of the outer electrode, and a second fluid-tight silver chloride seal between the insulator and the inner electrode, the portions of the metal members to which the silver chloride is bonded being silver-plated.

6. In a spark plug, an outer metal electrode of tubular shape, a tubular ceramic insulator disposed within and having its lower end terminating in substantially the plane of the end of the tubular outer electrode, a central electrode coextensive in length with and disposed within the tubular insulator, said insulator being provided with an annular boss and said outer electrode having a portion surrounding and conforming to the shape of said boss, a fluid-tight fused silver chloride seal between the boss and said portion of the outer electrode, a metal cap mechanically and electrically connected to the inner electrode and covering the top of the insulator, and a second fluid-tight silver chloride seal between the cap and the top of the insulator, the portions of the metal members to which the silver chloride is bonded being silver-plated.

7. In a spark plug, an outer metal electrode of tubular shape, a tubular ceramic insulator disposed within and having its lower end terminating in substantially the plane of the end of the tubular outer electrode, a central electrode coextensive in length with and disposed within the tubular insulator, said insulator being provided with an annular boss and said outer electrode having a portion surrounding and conforming to the shape of said boss, a fluid-tight fused seal between the boss and said portion of the outer electrode, and a second fluid-tight seal between the insulator and the inner electrode.

8. In a spark plug, an outer metal electrode of tubular shape, a tubular ceramic insulator disposed within and having its lower end terminating in substantially the plane of the end of the tubular outer electrode, a central electrode coextensive in length with and disposed within the tubular insulator, said insulator being provided with an annular boss and said outer electrode having a portion surrounding and conforming to the shape of said boss, a fluid-tight fused seal between the boss and said portion of the outer electrode, a metal cap mechanically and electrically connected to the inner electrode and covering the top of the insulator, and a second fluid-tight seal between the cap and the top of the insulator.

9. In a spark plug, a metal shell threaded for insertion into the engine block, and having a central bore, a tubular ceramic insulator disposed within the bore, a central electrode within the insulator, and means for forming a fluid-tight joint between the insulator and the metal shell, including an annular lug, a body of fused silver chloride interposed between and bonding the metal lug to the insulator and forming a fluid-tight joint therebetween, and threaded means cooperating with the metal shell for pressing the lug into fluid-tight relation to the interior of the metal shell, the portions of the metal members to which the silver chloride is bonded being silver-plated.

10. In a spark plug, a metal shell threaded for insertion into the engine block, and having a central bore, a tubular ceramic insulator disposed within the bore, a central electrode within the insulator, and means for forming a fluid-tight joint between the insulator and the metal shell, including an annular lug, a body of fused silver chloride interposed between and bonding the metal lug to the insulator and forming a fluid-tight joint therebetween, and threaded means cooperating with the metal shell for pressing the lug into fluid-tight relation to the interior of the metal shell, a cap electrically and mechanically connected to the inner electrode and a silver chloride seal between the cap and the top of the insulator, the portions of the metal members to which the silver chloride is bonded being silver-plated 11. In a spark plug, a metal shell threaded for insertion into the engine block and having a central bore provided with a tapered shoulder, a ceramic insulator having an enlarged annular body portion fitting said bore and provided with a tapered undersurface for cooperation with said tapered shoulder, a gasket between said tapered portions, an inner electrode within the insulator, said metal shell having an enlarged upper bore having its bottom tapered to provide the interior of the shell with a second shoulder, an annular metal lug upon the insulator, a body of fused silver chloride interposed between and bonding the lug to the insulator, and providing a fluid-tight joint therebetween, said lug having a portion tapered to correspond to the aforesaid second shoulder on the metal shell, a gasket between said second shoulder and said lug, and threaded means cooperating with the shell for pressing the lug against the second shoulder, the portions of the metal members to which the silver chloride is bonded being silver-plated.

12. In a spark plug, a metal shell threaded for insertion into the engine block, and having a central bore, a tubular ceramic insulator disposed within the bore, a central electrode within the insulator, and means for forming a fluid-tight joint between the insulator and the metal shell, including an annular lug, sealing means interposed between and bonding the metal lug to the insulator and forming a fluid-tight joint therebetween, and threaded means cooperating with the metal shell for pressing the lug into fluid-tight relation to the interior of the metal shell.

13. In a spark plug, a metal shell threaded for insertion into the engine block, and having a central bore, a tubular ceramic insulator disposed within the bore, a central electrode within the insulator, and means for forming a fluid-tight joint between the insulator and the metal shell, including an annular lug, sealing means interposed between and bonding the metal lug to the insulator and forming a fluid-tight joint therebetween, and threaded means cooperating with the metal shell for pressing the lug into fluid-tight relation to the interior of the metal shell, a cap electrically and mechanically connected to the inner electrode and sealing means between the cap and the top of the insulator.

14. In a spark plug, a metal shell threaded for insertion into the engine block and having a central bore provided with a tapered shoulder, a ceramic insulator having an enlarged annular body portion fitting said bore and provided with a tapered undersurface for cooperation with said tapered shoulder, a gasket between said tapered portions, an inner electrode within the insulator, said metal shell having an enlarged upper bore having its bottom tapered to provide the interior of the shell with a second shoulder, an annular metal lug upon the insulator, sealing means interposed between and bonding the lug to the insulator and providing a fluid-tight joint therebetween, said lug having a portion tapered to correspond to the aforesaid second shoulder on the metal shell, a gasket between said second shoulder and said lug, and threaded means cooperating with the shell for pressing the lug against the second shoulder.

15. A fluid-tight seal for forming a fluid-tight joint between ceramic and metal members comprising a body of fused silver chloride interposed between and bonded to said members, the portion of said metal member to which the silver chloride is bonded being silver-plated.

ARTHUR C. HASTINGS, Jr.